May 17, 1938. O. M. ALEXANDER 2,117,280
TRACK BODY
Filed Oct. 10, 1936 2 Sheets-Sheet 1

Inventor:
O. M. Alexander,
By E. F. Wenderoth
Atty.

May 17, 1938.  O. M. ALEXANDER  2,117,280
TRACK BODY
Filed Oct. 10, 1936  2 Sheets-Sheet 2
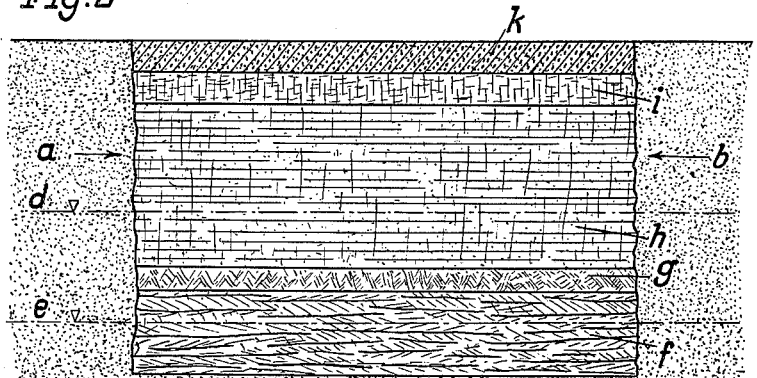
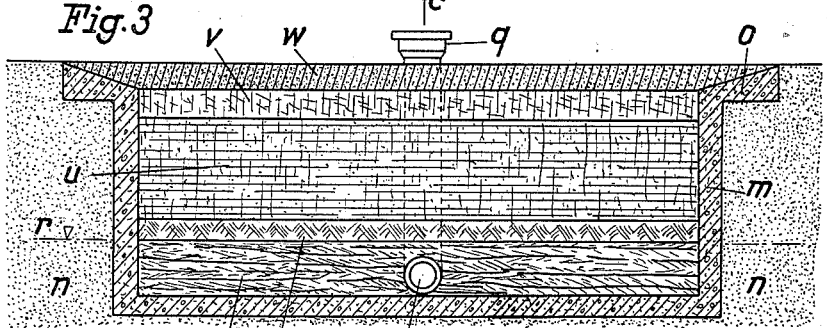
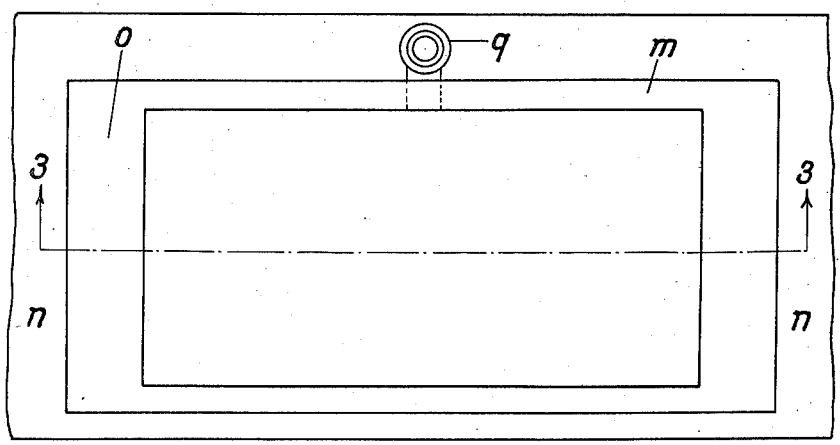

Patented May 17, 1938

2,117,280

UNITED STATES PATENT OFFICE 2,117,280

TRACK BODY

Oskar Martin Alexander, Bad Bramstedt, Germany

Application October 10, 1936, Serial No. 105,113
In Germany October 31, 1935

8 Claims. (Cl. 94—7)

This invention relates to a track-body construction formed of layers or strata of materials of different character permeable by water, being particularly adapted for use by patients suffering from ailments of the limb joints, e. g., of foot joints, of knee joints, or of hip joints, and also adapted for use for other purposes, as, for example, as an exercising ground for sportsmen of all kinds.

One of the under-layers of the track-body construction according to the invention consists of boggy soil which thus provides a basis or support susceptible of vibration and is open to communication with sub-soil water or with a body of water artificially maintained at a given level. As the result, it is ensured that the track-body can vibrate resiliently and that the vibrations which are set up on movement thereon and which are communicated to the human body shall be particularly gentle, and that the track-body shall retain continuously the property of receiving and transmitting such vibrations. The layers or strata composing the track-body according to the invention consist preferably not only of boggy soil but also of brushwood, cinders, peat litter or the like, with a layer of gravel as a top layer or covering layer.

The maintenance of the communication between the sub-soil water (or the body of water artificially maintained at a given level) and the lower layer consisting of boggy soil may be effected under favourable conditions if there is used as under layer a yielding material presenting relatively large interstices. Such a material is, for example, brushwood.

The invention therefore provides that the undermost layer besides the boggy soil in communication with the water shall consist of an elastically yielding material of loose structure, such as brushwood or the like.

The invention further provides means for rendering practicable the use of an artificially maintained water level. In this connection the lowermost layer besides the layer of boggy soil in communication with the water supply consists of an elastically yielding material of loose structure such as brushwood or the like. The several materials including the water may occupy an open-topped container formed after the manner of a trough, and composed of material impermeable by water, for example, concrete, in which the water content is controllable.

Embodiments of the invention are illustrated diagrammatically by way of example in the accompanying drawings:

Fig. 2 is a section through a second embodiment representing a track-body formed in the field.

Fig. 3 is a section on the line 3—3 of Fig. 4 and shows a construction with an artificially maintained water level.

Fig. 4 is a plan of Fig. 3.

Figure 1:
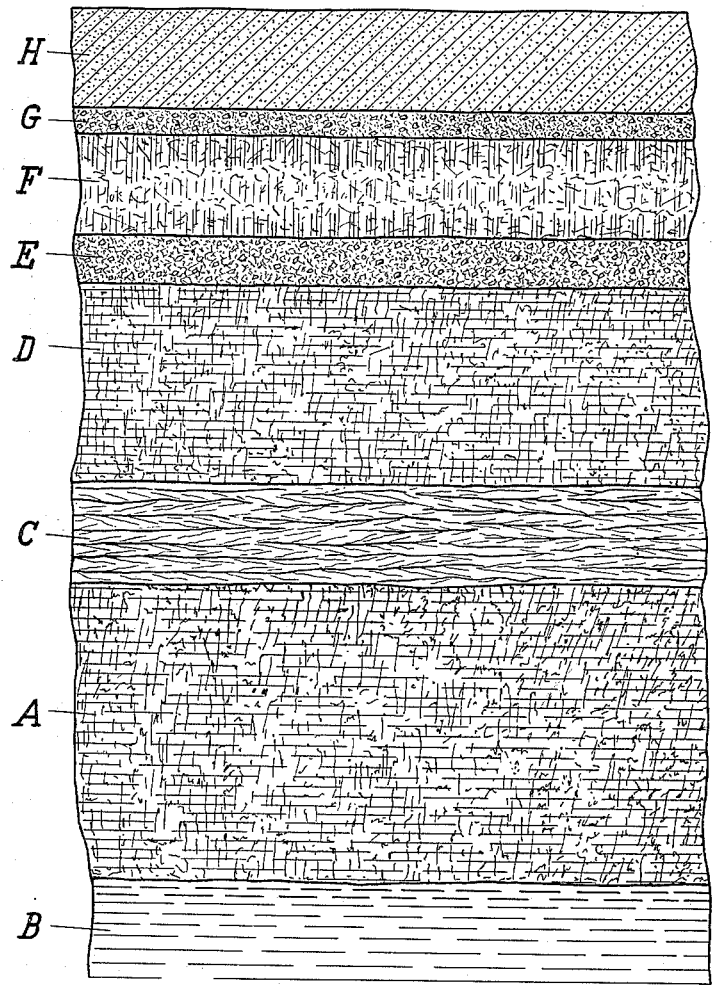
Fig. 1 shows one embodiment in section.

In Fig. 1 the lowermost layer consisting of boggy soil is connected to the sub-soil water B. Instead of the sub-soil water there may be used a body of water artificially maintained at a given level. Above the boggy soil layer are a layer of brushwood C, then another layer D of boggy soil, then a layer E of cinders, then a layer F of peat litter, then a layer G of cinders, and, on top, a covering layer H of gravel.

The arrangement and composition of the layers may be different from that illustrated in this example.

A track-body so formed has the property when travelled over of being caused to vibrate in consequence of its resilience, the vibrations being transmitted to the body of a person moving on the track. As a result, the lower limbs and joints of the body are relieved and loosened. As compared with walking on an ordinary roadway, walking on the present track is easier, less troublesome and less tiring in consequence of the resilient vibration of the ground.

In the arrangement shown in Fig. 2 the boundaries of the track built in the soil are represented by the substantially vertical lines $a$ and $b$ and the lowermost horizontal line $c$. As is understood, the soil is excavated to receive the track-body the cross-section of which excavation is limited by the lines $a$, $b$, $c$. The uppermost position of the sub-soil water level is indicated by way of example by the chain line $d$ and the lowermost position by the chain line $e$. As the lowermost layer $f$ there is employed in this case, as is preferred, a layer $f$ of elastically yielding material of loose structure provided with large gaps or interstices, particularly brushwood. This layer of brushwood is covered over with a relatively thin layer $g$ of heath. This layer of heath prevents the penetration of pieces of bog from the bog layer $h$ above into the interstices of the layer $f$ of brushwood. Superposed on the bog layer is a layer $i$ of peat litter on top of which is a covering layer $k$ which may consist of ashes, cinders, gravel or the like.

In the embodiment illustrated in Figs. 3 and 4 $m$ denotes a trough-like container the walls and bottom of which consist of material impermeable by water, preferably concrete. The container $m$ may be movable, or, as is assumed in the example, may be set up and allowed to remain in an excavation previously provided. $n$ denotes the soil which receives the container $m$. The rim $o$ of the container is preferably flush with the surface of the soil. In one of the side walls of the container $m$ near the bottom, there is provided an opening $p$ to which is connected a pipe $q$ leading upwardly through the soil. The container $m$ is partly filled with a predetermined quantity of water. The water level $r$ in the container can be ascertained by examination of the pipe $q$, and can be controlled by filling or withdrawal through the said pipe.

On the bottom of the container $m$, that is, immersed wholly or partly in the water, in the example shown in Fig. 3, there is a layer $s$ of an elastically yielding material of loose structure, such as brushwood. On this layer is superposed a thinner layer $t$ of heather on which lies a layer $u$ of bog. The last mentioned layer is covered by a peat litter layer $v$ and a top layer $w$ composed of ashes, cinders, gravel or the like.

By the use of a material of loose structure presenting relatively large gaps and interstices, such as brushwood or the like, for the lowermost layer it is ensured that the track shall be particularly well sprung and adapted to be set in vibration. The layer of brushwood forms in a sense a cushion or a mattress on which the other layers rest. So long as it is in communication with the water, water can pass through this layer into the superposed layers, particularly into the bog layer, so that, in consequence of its high receptivity of water, this last mentioned layer is continuously kept wet and retains its spongelike resilient and yielding character. In this connection, the very yielding lowermost layer, preferably consisting of brushwood, contributes to the vibrations.

When the lowermost layer, i. e., the brushwood layer, is itself wholly or in part submerged in the water, it forms in a sense a water cushion having the resilient yielding properties of a brushwood layer, while keeping the upper layers, particularly the bog layer, continuously kept wet in consequence of the communication with the water storage. It is recommended that the brushwood be kept almost entirely covered by water, as it then can hold for a practically unlimited time. With this arrangement, there is provided in a sense a live water lane which is filled with brushwood or the like and which forms the lowermost layer of the track. In this last layer due to the relatively large interstices the water is distributed over the entire length of the track. In consequence of these interstices the water can rise readily and keep the upper layers moist. It may be preferable to use bundles of brushwood which are laid lengthwise in the longitudinal direction of the track.

A vibratory track-body according to the invention may be used with great advantage for the treatment of patients suffering from ailments of the limbs, feet and the like. It can also be used as an exercise track for sportsmen of all kinds as it is found that exercise by running on hard tracks does not sufficiently loosen the joints.

In general, for sport purposes, the vibrations of the ground need not be so large as for curative purposes.

Instead of the above mentioned materials, namely, peat litter, ashes, cinders and gravel, other materials can be used for the covering layers provided they are sufficiently firm to constitute the surface of the track and offer sufficient resistance to wear.

By suitable selection of the depth of the several layers and by suitable choice of the properties, particularly of the covering layers, it is possible to determine the amplitude of the vibrations and, if desired, to vary the amplitude. Variation of the amplitude of the vibrations is readily effected in the arrangement with an artificially maintained water level according to Figs. 3 and 4, the water level being varied by allowing water to flow into or out of the container.

The depth of the track if laid in the fields depends on the level of the sub-soil water. For treatment of patients suffering from ailments of the joints and the like, with a given position of the sub-soil water, a total depth of the track-body of about 170 cm. has been found suitable. In this case, the layer of brushwood has a thickness of about 30 cm.; the layer of boggy soil has a total thickness of about 130 cm., it being understood that different kinds of boggy soil may be used, while the covering layer has a total thickness of about 10 cm. In installations with an artificially maintained water level a total depth of about 1 metre is in general sufficient.

An arrangement according to the invention offers special advantage because it renders it possible for the vibrations of the track-body to pass downwardly for the entire depth and to return upwardly.

This is particularly important in the use of the arrangement for sport purposes where the top layers must be fairly strong and solid in order that they can withstand the impact of spiked shoes. A track-body not arranged according to the invention would not enable the vibrations to penetrate the cinder surface from above to the base of the track-body and to return vice versa.

I claim:

1. An artificial foundation comprising a layer of relatively hard material, an underlying layer of a material having a spongy, resilient nature when wet and a body of water maintained in contact with said spongy material for maintaining said spongy material substantially wet in order to give said foundation a vibratory character to shocks.

2. An artificial foundation comprising a layer of relatively hard material, an underlying brushwood layer and a body of water maintained in contact with said brushwood layer to maintain the same substantially wet in order to give said foundation a vibratory character.

3. An artificial foundation comprising a layer of relatively hard material, an underlying brushwood layer, a body of water, means for maintaining said body of water and said brushwood layer being immersed in said body of water.

4. An artificial foundation comprising a layer of relatively hard material, an underlying layer of material having a spongy, resilient nature when wet, a body of water maintained in contact with said underlying layer of material for maintaining said material wet and a further underlying layer of an elastically yielding material of loose structure.

5. An artificial foundation comprising a layer of relatively hard material, an underlying layer of boggy soil under said first mentioned layer, an underlying layer of brushwood and a body of water maintained in contact with said underlying layers to give said foundation a vibratory character especially useful in athletic equipment and foundations.

6. An artificial foundation comprising a top layer of relatively hard and finely divided material, a layer of peat litter thereunder, a layer of a material having a spongy, resilient nature when wet under said peat litter layer and a body of water maintained in contact with said spongy material to give said foundation a vibratory character to shocks.

7. An artificial foundation comprising an open-topped containing structure, a body of water in said structure, means for introducing water into said structure to a desired level, a layer of material which has a spongy, resilient nature when wet disposed in said water and a top layer of relatively hard material above said layer of spongy material.

8. An artificial foundation comprising an open-topped containing structure, a body of water in said structure, means for introducing water into said structure to a desired level, a layer of material which has a spongy, resilient nature when wet disposed in said water and a top layer of relatively hard material above said layer of spongy material, and an intermediate layer of peat litter.

OSKAR MARTIN ALEXANDER.